June 11, 1963 G. W. BOHON 3,093,363
DETACHABLE FENCE
Filed Oct. 5, 1961
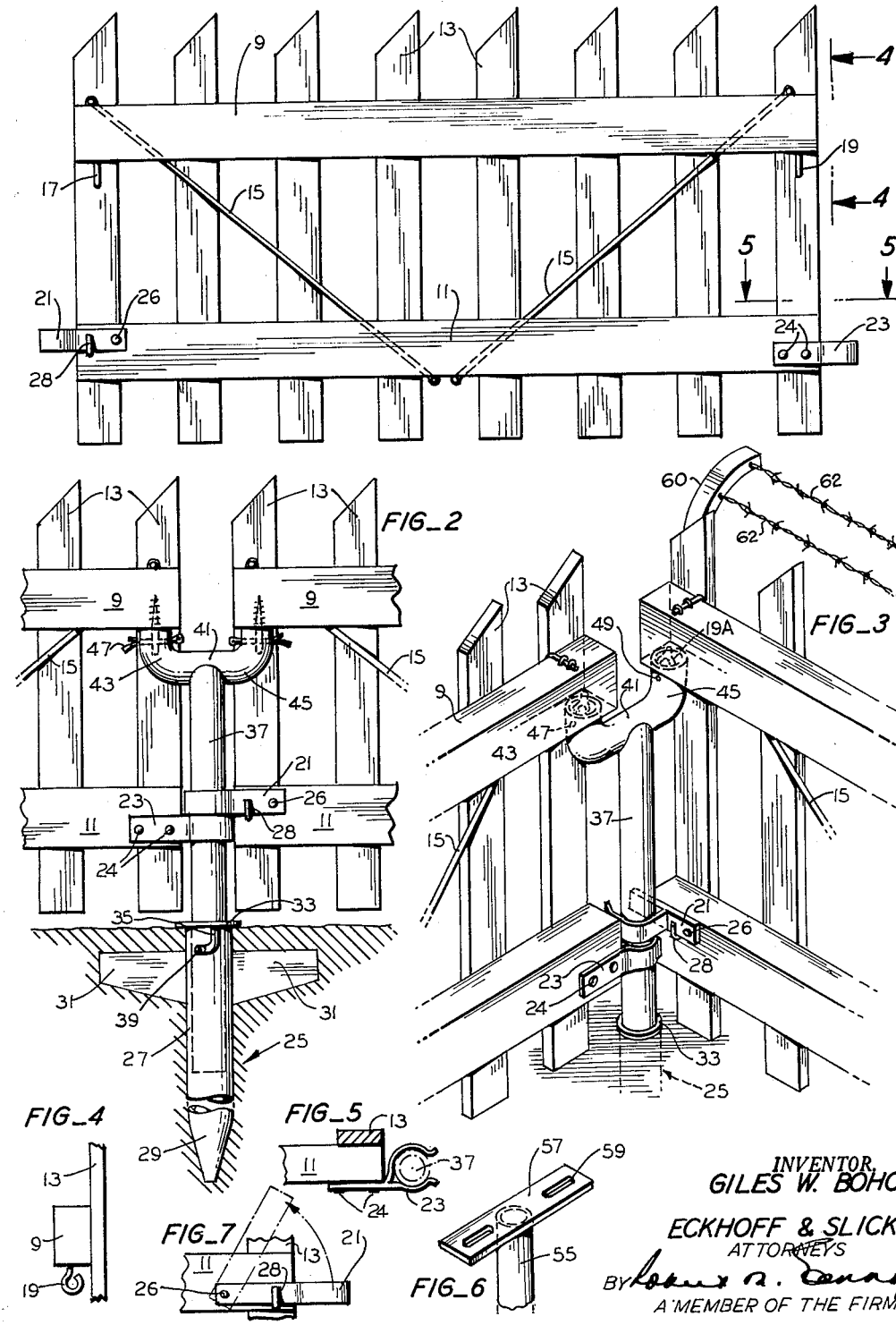
INVENTOR.
GILES W. BOHON
ECKHOFF & SLICK
ATTORNEYS
BY
A MEMBER OF THE FIRM

United States Patent Office 3,093,363
Patented June 11, 1963

3,093,363
DETACHABLE FENCE
Giles W. Bohon, San Jose, Calif., assignor, by mesne assignments, to Raymond J. Bailey
Filed Oct. 5, 1961, Ser. No. 143,174
2 Claims. (Cl. 256—26)

This invention relates to a fence and more particularly relates to a fence structure which can be erected easily as a temporary fence or installed as a permanent or semi-permanent fence.

In accordance with the present invention, a fence is provided having a series of posts which lock into sockets set in the ground. The posts are of such a nature that they can be readily removed, leaving the sockets in the ground yet when locked in place form a strong structure which can be used as a permanent fence. Further, the sockets have flanges thereon so that when installed in the ground the sockets will not wobble or work loose even when the post is set into soft ground and the fence subjected to wind and rain. The socket is of such a nature that it can be readily pried up and re-used or can be set in concrete for a semi-permanent fence. Thus, in accordance with the present invention, a series of sockets can be set in ground and left as a permanent fence or the fence proper and posts can be removed leaving the sockets in place when it is desired to move the fence for a period of time and reinstall it.

Other advantages will be apparent from the specification as follows.

In the drawings forming part of this application:

FIGURE 1 is a side view of a section of one embodiment of the fence of the present invention.

FIGURE 2 is a side view of a post and socket made in accordance with the present invention showing portions of two adjoining sections of fence.

FIGURE 3 is a perspective view on an enlarged scale showing the structure which may be employed at corners.

FIGURE 4 is a partial end view on the line 4—4 of FIGURE 1.

FIGURE 5 is a sectional view on the line 5—5 of FIGURE 1.

FIGURE 6 is a perspective view of an alternate top structure which can be used on the posts of the present invention.

FIGURE 7 is a detail view showing one of the post-clamping members which may be moved to facilitate erection of the fence.

Turning now to a description of the drawing by reference characters, there is shown a fence having an upper rail 9 and a lower rail 11. In the particular embodiment of the fence shown, a series of pickets 13 is employed, but it is understood that any suitable fencing material could be used such as woven wire. The fence may be provided with braces 15. On the upper rail of the fence, two depending eye rings 17 and 19 are provided for purposes hereinafter specified. At the bottom of the fence on rail 11, clamps 21 and 23 are provided for purposes hereinafter specified. The lower clamp 23 is fixed in place by means of the bolts or rivets 24 while the upper clamp 21 is pivoted at 26 and provided with a pin 28 to hold it in a horizontal position.

To erect the fence, a plurality of sockets generally designated 25 is employed. Each of these sockets consists of a tubular body portion 27, suitably formed from a section of pipe, having an end 29 which may be formed by pointing or by flattening the end of the tubular portion. Near the top of the tubular portion, the flanges 31 are provided which serve to lock the socket into the ground and also which form convenient members against which one can pry if it is desired to remove the socket. On the top of the socket 25 a collar 33 is provided which serves to locate the socket at the surface of the ground and to prevent entry of dirt. At the top of the tubular portion 27 there is a slot 35 formed in the shape of an L which serves as a locking element.

The posts of the fence consist of a central member 37 which may be formed of pipe or similar structural material. Spaced a short distance from the bottom of the post 37 is an outstanding pin 39 which may be inserted in the L-shaped slot 35. The post is started with the pin in the vertical section of the slot, pushed down to the bottom of the slot and then given a slight turning movement locking the pin in the position shown in FIGURE 2. At the top of the post 37 a cross member 41 is provided having the arms 43 and 45 thereon. The cross members 43 and 45 have holes 47 and 49 therethrough.

To erect the fence, it is only necessary to drive a series of the sockets 25 into the ground at suitable intervals. Posts 37 are then inserted in the sockets and locked into position by means of the pin 39. The fence proper is then erected by pushing the clamp members 21 or 23 over the post and sliding the fence down until the eye ring 19 is centered in one of the members 43 or 45. Cotter pin 47 may then be inserted to lock the fence in place. Thus, there is provided a fence which has all of the desirable attributes of a permanent fence yet one which is easily erected and taken down.

In FIGURE 3 there is shown the method used when a corner is formed. It will be noted that the only modification of the structure which is necessary is that one of the eye rings 19, in this instance designated 19A, be turned 90° from the position shown in FIGURES 1 and 2. Then the fence may be erected as before.

In many instances, it is desirable to provide means whereby both of the lower clamps can be swung upwardly. For instance, if both clamps can be moved, the clamps may be temporarily moved upwardly so that a fence panel can be swung on its upper connections so that one can mow under it. This is shown in FIGURE 7 where the clamp 21 is pivoted near the bottom of the rail 11 and held in place by means of the pin 28.

FIGURE 6 shows an alternate form of top structure for the posts. Here a post 55 is provided with a flat member 57 which is welded or fastened by other suitable means to the top thereof. The member 57 has elongated slots 59 therein which are adapted to receive the eye rings such as those at 17 and 19. However, when this embodiment of the posts is used, it is necessary to move the eye rings 17 and 19 90° from their normal position, i.e. to the position shown at 19A in FIGURE 3.

For use as a farm fence the top of the fence may be provided with one or more strands of barbed wire. Thus, as is shown in FIGURE 3, arms 60 extend upwardly and outwardly from the fence and support one or more strands of barbed wire 62. The panel may be turned so that the wire extends on the side of the fence the stock are on.

It is believed apparent from the foregoing that I have provided a strong, easily erected fence which can be used either as a permanent fence or which can be used as an easily erected and easily moved temporary fence.

I claim:
1. A fence structure comprising in combination:
 (a) a fence element having an upper rail and a lower rail with means extending between the rails for holding the rails in spaced relationship;
 (b) a post having a bifurcated upper end terminating in hollow members having upper surfaces adapted to support abutting top rails of said fence elements;
 (c) eye rings extending downwardly from the ends of the top rails, said rings extending into the hollow members;
 (d) locking pins extending through holes in the hollow members and passing through the eye rings, whereby the top rail is locked in place; and
 (e) clamp means extending outwardly from each end of the bottom rails, said clamps detachably fastening the bottom rails to the post.
2. The structure of claim 1 wherein one of the clamps on the bottom rail is pivoted for tilting movement.

References Cited in the file of this patent

UNITED STATES PATENTS

| | | |
|---|---|---|
| 134,624 | Anderson | Jan. 7, 1873 |
| 1,430,382 | Johnson | Sept. 26, 1922 |
| 1,457,900 | Fairbairn | June 5, 1923 |
| 2,103,948 | Jones | Dec. 28, 1937 |